(12) United States Patent
Takano

(10) Patent No.: US 7,860,014 B2
(45) Date of Patent: Dec. 28, 2010

(54) RANGING SYSTEM, TRANSMITTING TERMINAL, RECEIVING TERMINAL, RANGING METHOD, AND COMPUTER PROGRAM

(75) Inventor: Hiroaki Takano, Saitama (JP)

(73) Assignee: Sony Corporation (JP)

( * ) Notice: Subject to any disclaimer, the term of this patent is extended or adjusted under 35 U.S.C. 154(b) by 1302 days.

(21) Appl. No.: 11/281,202

(22) Filed: Nov. 16, 2005

(65) Prior Publication Data

US 2006/0104198 A1    May 18, 2006

(30) Foreign Application Priority Data

Nov. 18, 2004    (JP)    .............................. 2004-334632

(51) Int. Cl.
G08C 15/00    (2006.01)
H04J 1/16    (2006.01)
(52) U.S. Cl. ..................................... 370/241; 370/249
(58) Field of Classification Search .................. 370/241, 370/249, 310, 338
See application file for complete search history.

(56) References Cited

U.S. PATENT DOCUMENTS

| | | | | |
|---|---|---|---|---|
| 5,384,891 A | * | 1/1995 | Asakawa et al. | ............. 704/220 |
| 2004/0199686 A1 | * | 10/2004 | Karaoguz | ..................... 710/72 |
| 2004/0245995 A1 | * | 12/2004 | Williams | ..................... 324/512 |
| 2009/0052564 A1 | * | 2/2009 | Hayashi et al. | ............. 375/260 |

FOREIGN PATENT DOCUMENTS

| | | |
|---|---|---|
| JP | 07134173 A | 5/1995 |
| JP | 08082674 A | 3/1996 |
| JP | 2002016579 A | 1/2002 |
| JP | 2002323556 A | 11/2002 |
| JP | 2003264529 A | 9/2003 |
| JP | 2004258009 A | 9/2004 |

OTHER PUBLICATIONS

Office Action from Japanese U.S. Appl. No. 2004-334632, dated Apr. 27, 2010.
Akihiro Kajiwara et al., "Road surface clutter suppression by stepped FM radar" Institute of Electronics, Information and Communication Engineers article magazine B vol. J84-B No. 10 Corporate judicial person Institute of Electronics, Information and Communication Engineers, Oct. 1, 2001, pp. 1848-1856.
Kikuma Nobuyoshi Adaptive Signal Processing by Use of Array Antennas, "Science Press, Inc"., Sep. 20, 1998 pp. 191-203.
IEEE Std 802.11a-1999 (2003) Supplement to IEEE Standard for Information technology Telecommunications and information exchange between systems Local and metropolitan area networks Specific requirements. Part 11: Wireless LAN Medium Access Control (MAC) and Physical Layer (PHY) specifications.

* cited by examiner

*Primary Examiner*—Kevin C Harper
(74) *Attorney, Agent, or Firm*—Lerner, David, Littenberg, Krumholz & Mentlik, LLP

(57) ABSTRACT

A ranging system is disclosed which measures a distance between terminals operating on a multi-carrier transmission system. The ranging system includes a frequency domain data processing device that acquires impulse responses by subjecting data from transmitted and/or received packets to fast discrete Fourier transform for conversion into frequency domain data subject to a predetermined process and by applying a spectrum estimation algorithm to the processed frequency domain data.

19 Claims, 9 Drawing Sheets

FIG.10

| SNR=20dB | WHERE SNAP SHOT =100 | | | |
|---|---|---|---|---|
| TRY COUNT | SET TIME [ns] | ACTUAL ESTIMATED TIME [ns] | ERROR TIME [ns] | RANGE ERROR [cm] |
| 1 | 5 | 5.008 | 0.008 | 0.24 |
| 2 | 5 | 4.996 | 0.004 | 0.12 |
| 3 | 5 | 4.991 | 0.009 | 0.27 |
| 4 | 5 | 4.997 | 0.003 | 0.09 |
| 5 | 5 | 5 | 0 | 0 |
| | | | | 0.144 cm ON AVERAGE |

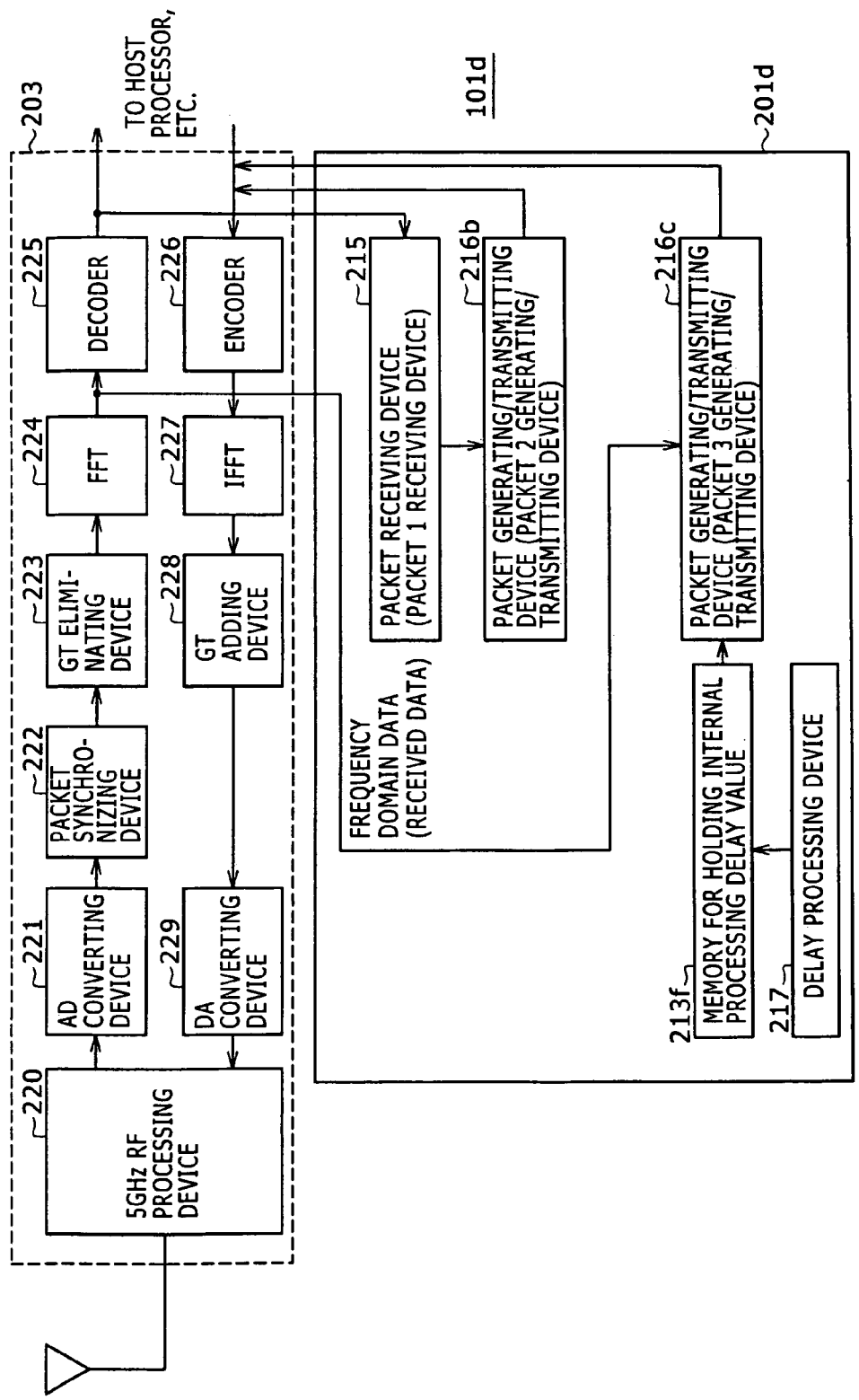

RANGING SYSTEM, TRANSMITTING TERMINAL, RECEIVING TERMINAL, RANGING METHOD, AND COMPUTER PROGRAM

CROSS-REFERENCE TO RELATED APPLICATIONS

The present invention contains subject matter related to Japanese Patent Application JP 2004-334632 filed with the Japanese Patent Office on Nov. 18, 2004, the entire contents of which being incorporated herein by reference.

BACKGROUND OF THE INVENTION

The present invention relates to a ranging system, a transmitting terminal, a receiving terminal, a ranging method, and a computer program for use with a multi-carrier transmission system.

It is common knowledge that a plurality of computers are connected by suitable telecommunication means to constitute a wireless local area network (LAN) over which files and data are exchanged and shared wirelessly.

For wireless LANs setups, there exist a number of standards, notably IEEE 802.11a. The IEEE 802.11a standard supports the 5-GHz OFDM modulation method that provides communication speeds of up to 54 Mbps. According to the standard, wireless communications are conducted using 52 subcarriers.

There exist ranging systems developed to measure distances between devices using a wireless LAN subject to the IEEE 802.11a standard or the like. To measure the distance between a transmitting and a receiving terminal on the wireless LAN requires that each terminal first determine the positions where packets are received.

Determining where packets are received over the wireless LAN illustratively under the IEEE 802.11a may involve determining the packet-receiving positions in terms of synchronizing positions. For example, suppose that following the operation of an AD converter in the receiving terminal, a digital circuit in the receiving terminal operates at a clock speed of 80 MHz.

Suppose also that the received packets are each headed by a known signal sequence. After the processing by the AD converter of the receiving terminal, the known signal is used to calculate correlations with the received signals. Because the correlations tend to become large in the positions of the known signal embedded in the packets, a search for a peak of the correlations makes it possible to determine where each packet was received. This in turn allows the distance between the terminals to be measured.

Meanwhile, in a field quite different from the ranging over wireless LANs, there exists the so-called MUSIC algorithm, a spectrum estimation algorithm for use in analyzing signal propagations based on adaptive arrays. This technique is discussed illustratively in "Adaptive Signal Processing by Use of Array Antennas" by Nobuyoshi Kikuma (published in Japanese from Science Press, Inc. on Sep. 20, 1998; pp. 191-203).

SUMMARY OF THE INVENTION

With the 5-GHz OFDM modulation system constituting a multi-carrier transmission system, the system clock in use is about 80 MHz. Transmitting and receiving terminals of the system can only determine their synchronizing positions in units of the system clock. It follows that errors tend to be large when ranging is performed on the basis of packet reception times.

For example, the 80-MHz clock signifies that one clock cycle is 12 nanoseconds (ns; from 1/80 MHz). That is, the error per clock cycle in an 80-MHz clock setup can be as large as 3.6 meters ($=3.0\times10^8$ m/s$\times$12 ns, $3.0\times10^8$ m/s being the speed of light). Ranging is done with precision only on the order of meters, which means errors can be unacceptably large.

As a result, performing the ranging between terminals over a wireless LAN under the IEEE 802.11a or the like in the household or in a small office has not been practical because of the large errors involved.

Recently, the MUSIC algorithm has shown promise of effective application in wireless LANs. The MUSIC algorithm used to be employed primarily for propagation analysis with adaptive arrays. Today, this technique holds promise of getting utilized in diverse wireless LAN applications.

The present invention has been made in view of the above circumstances and provides a ranging system, a transmitting terminal, a receiving terminal, a ranging method, and a computer program offering innovations and improvements for reducing ranging errors with multi-carrier transmission systems.

According to one embodiment of the present invention, there is provided a ranging system for measuring a distance between terminals operating on a multi-carrier transmission system, the ranging system including: a frequency domain data processing device acquiring impulse responses by subjecting data from transmitted and/or received packets to fast discrete Fourier transform for conversion into frequency domain data subject to a predetermined process and by applying a spectrum estimation algorithm to the processed frequency domain data.

Where the ranging system practiced as one embodiment of the present invention is in use, data derived from transmitted and/or received packets are first subjected to fast discrete Fourier transform for conversion into frequency domain data which in turn undergoes a predetermined process. A spectrum estimation algorithm is then applied to the processed frequency domain data in order to acquire impulse responses.

In one preferred structure of the above-outlined embodiment of the present invention, the impulse responses may constitute time information indicating highly accurate times at which the packets were received and/or transmitted. This preferred structure permits acquisition of precise packet reception and/or transmission times, thereby contributing to more accurate measurement of the distance between terminals.

Another preferred structure of the above embodiment may further include: an interpolating device interpolating carrier holes in the frequency domain data; and a frequency averaging device frequency-averaging the interpolated frequency domain data; wherein the predetermined process may include the interpolation performed by the interpolating device and the frequency-averaging carried out by the frequency averaging device. This preferred structure provides adequate impulse responses through the application of the spectrum estimation algorithm even if carrier holes exist in the frequency domain data obtained by subjecting the data from the transmitted and/or received packets to fast discrete Fourier transform.

In a further preferred structure of the above embodiment, the interpolating device may interpolate the data corresponding to the carrier holes using data from an adjacent carrier.

According to another embodiment of the present invention, there is provided a transmitting terminal constituting part of a ranging system for measuring a distance between terminals operating on a multi-carrier transmission system, the transmitting terminal including: a packet transmitting device transmitting a first packet to a receiving terminal communicating with the transmitting terminal; a time information generating device generating at least first packet transmission time information indicating the time at which the first packet was transmitted; a turnaround time estimating device estimating a packet turnaround time between the receiving and the transmitting terminals based on the first packet transmission time information and on second packet reception time information indicating the time at which a second packet was transmitted to the transmitting terminal by the receiving terminal upon receipt of the first packet; a fast discrete Fourier transform processing device subjecting data from the second packet received from the receiving terminal to fast discrete Fourier transform for conversion into first frequency domain data; a frequency domain data processing device acquiring a first impulse response by subjecting the first frequency domain data to a predetermined process and by applying a spectrum estimation algorithm to the processed first frequency domain data; a propagation time correcting device which, upon receipt of a third packet from the receiving terminal in a suitably timed manner, estimates a radio wave turnaround propagation time by subtracting an internal processing delay time placed in the third packet from the packet turnaround time in order to correct, based on the first impulse response and on a second impulse response placed in the third packet, the radio wave turnaround propagation time into a corrected propagation turnaround time; and a distance calculating device acquiring the distance between the transmitting and the receiving terminals in accordance with the corrected propagation turnaround time and with radio wave velocity.

Where the transmitting terminal practiced as another embodiment of the present invention is in use, the packet turnaround time is estimated as the time it takes a packet to reach the receiving terminal and to return from there. The estimation is based on the time at which the first packet was transmitted and on the time at which the second packet was received. A highly accurate propagation turnaround time, i.e., the time it takes radio waves to reach the receiving terminal and to return from there, is then obtained on the basis of the internal processing delay time, first impulse response, and second impulse response. This embodiment of the present invention thus makes it possible to acquire propagation turnaround time with precision, whereby ranging error is minimized and accuracy of the measured distance between terminals is maximized even where the multi-carrier transmission system is in use.

In one preferred structure of the above-outlined embodiment of the present invention, the second impulse response may be acquired by subjecting data from the first packet received by the receiving terminal to fast discrete Fourier transform for conversion into second frequency domain data subject to a predetermined process and by applying the spectrum estimation algorithm to the processed second frequency domain data, and the internal processing delay time may be a delay time involved in an internal process performed by the receiving terminal.

In another preferred structure of the above embodiment, the first impulse response may be time information indicating a highly accurate time at which the second packet was received, and the second impulse response may be time information indicating a highly accurate time at which the first packet was received.

A further preferred structure of the above embodiment may further include: an interpolating device interpolating carrier holes in the frequency domain data; and a frequency averaging device frequency-averaging the interpolated frequency domain data; wherein the predetermined process may include the interpolation performed by the interpolating device and the frequency-averaging carried out by the frequency averaging device.

In an even further preferred structure of the above embodiment, the interpolating device may interpolate the data corresponding to the carrier holes using data from an adjacent carrier.

According to a further embodiment of the present invention, there is provided a ranging method for use with a transmitting terminal constituting part of a ranging system for measuring a distance between terminals operating on a multi-carrier transmission system, the ranging method including the steps of: transmitting a first packet to a receiving terminal communicating with the transmitting terminal; generating at least first packet transmission time information indicating the time at which the first packet was transmitted; estimating a packet turnaround time between the receiving and the transmitting terminals based on the first packet transmission time information and on second packet reception time information indicating the time at which a second packet was transmitted to the transmitting terminal by the receiving terminal upon receipt of the first packet; subjecting data from the second packet received from the receiving terminal to fast discrete Fourier transform for conversion into first frequency domain data; acquiring a first impulse response by subjecting the first frequency domain data to a predetermined process and by applying a spectrum estimation algorithm to the processed first frequency domain data; upon receipt of a third packet from the receiving terminal in a suitably timed manner, estimating a radio wave turnaround propagation time by subtracting an internal processing delay time placed in the third packet from the packet turnaround time in order to correct, based on the first impulse response and on a second impulse response placed in the third packet, the radio wave turnaround propagation time into a corrected propagation turnaround time; and acquiring the distance between the transmitting and the receiving terminals in accordance with the corrected propagation turnaround time and with radio wave velocity.

According to an even further embodiment of the present invention, there is provided a computer program for causing a computer to function as a transmitting terminal constituting part of a ranging system for measuring a distance between terminals operating on a multi-carrier transmission system, the computer program including: a packet transmitting element for transmitting a first packet to a receiving terminal communicating with the transmitting terminal; a time information generating element for generating at least first packet transmission time information indicating the time at which the first packet was transmitted; a turnaround time estimating element for estimating a packet turnaround time between the receiving and the transmitting terminals based on the first packet transmission time information and on second packet reception time information indicating the time at which a second packet was transmitted to the transmitting terminal by the receiving terminal upon receipt of the first packet; a fast discrete Fourier transform processing element for subjecting data from the second packet received from the receiving terminal to fast discrete Fourier transform for conversion into first frequency domain data; a frequency domain data processing element for acquiring a first impulse response by subjecting the first frequency domain data to a predetermined process and by applying a spectrum estimation algorithm to the processed first frequency domain data; a propagation time correcting element which, upon receipt of a third packet from the receiving terminal in a suitably timed manner, estimates a radio wave turnaround propagation time by subtracting an internal processing delay time placed in the third packet from the packet turnaround time in order to correct, based on the first impulse response and on a second impulse response placed in the third packet, the radio wave turnaround propagation time into a corrected propagation turnaround time; and a distance calculating element for acquiring the distance between the transmitting and the receiving terminals in accordance with the corrected propagation turnaround time and with radio wave velocity.

According to a still further embodiment of the present invention, there is provided a receiving terminal constituting part of a ranging system for measuring a distance between terminals operating on a multi-carrier transmission system, the receiving terminal including: a first packet transmitting device which, upon receipt of a first packet from a transmitting terminal communicating with the receiving terminal, generates a second packet for transmission to the transmitting terminal; a fast discrete Fourier transform processing device subjecting data from the first packet received from the transmitting terminal to fast discrete Fourier transform for conversion into frequency domain data; a frequency domain data processing device acquiring an impulse response by subjecting the frequency domain data to a predetermined process and by applying a spectrum estimation algorithm to the processed frequency domain data; a processing delay calculating device acquiring an internal processing delay time as a processing delay time involved in an internal process performed by the receiving terminal; and a second packet transmitting device generating a third packet including at least the impulse response and the internal processing delay time in order to transmit the third packet in a suitably timed manner to the transmitting terminal. The suitable timing signifies any time following receipt of the first packet. Illustratively, the second packet may be generated simultaneously with or immediately after reception of the first packet.

In one preferred structure of the above-outlined embodiment of the present invention, the impulse response may constitute time information indicating a highly accurate time at which the first packet was received.

Another preferred structure of the above embodiment may further include: an interpolating device interpolating carrier holes in the frequency domain data; and a frequency averaging device frequency-averaging the interpolated frequency domain data; wherein the predetermined process may include the interpolation performed by the interpolating device and the frequency-averaging carried out by the frequency averaging device.

In a further preferred structure of the above embodiment, the interpolating device may interpolate the data corresponding to the carrier holes using data from an adjacent carrier.

According to a yet further embodiment of the present invention, there is provided a transmitting terminal constituting part of a ranging system for measuring a distance between terminals operating on a multi-carrier transmission system, the transmitting terminal including: a packet transmitting device transmitting a first packet to a receiving terminal communicating with the transmitting terminal; a time information generating device generating at least first packet transmission time information indicating the time at which the first packet was transmitted; a turnaround time estimating device estimating a packet turnaround time between the receiving and the transmitting terminals based on the first packet transmission time information and on second packet reception time information indicating the time at which a second packet was transmitted to the transmitting terminal by the receiving terminal upon receipt of the first packet; a fast discrete Fourier transform processing device subjecting data from the second packet received from the receiving terminal to fast discrete Fourier transform for conversion into first frequency domain data; a frequency domain data processing device which, upon receipt of a third packet from the receiving terminal in a suitably timed manner, acquires a first impulse response by subjecting second frequency domain data included in the third packet to a predetermined process and by applying a spectrum estimation algorithm to the processed second frequency domain data, the frequency domain data processing device further acquiring a second impulse response by subjecting the first frequency domain data to a predetermined process and by applying the spectrum estimation algorithm to the processed first frequency domain data; a propagation time correcting device estimating a radio wave turnaround propagation time by subtracting an internal processing delay time placed in the third packet from the packet turnaround time in order to correct, based on the first and the second impulse responses, the radio wave turnaround propagation time into a corrected propagation turnaround time; and a distance calculating device acquiring the distance between the transmitting and the receiving terminals in accordance with the corrected propagation turnaround time and with radio wave velocity.

Where the transmitting terminal practiced as a yet further embodiment of the present invention is in use, the packet turnaround time is estimated as the time it takes a packet to reach the receiving terminal and to return from there. The estimation is based on the time at which the first packet was transmitted and on the time at which the second packet was received. A highly accurate propagation turnaround time, i.e., the time it takes radio waves to reach the receiving terminal and to return from there, is then obtained on the basis of the internal processing delay time, first impulse response, and second impulse response. This embodiment of the present invention thus makes it possible to acquire propagation turnaround time with precision, whereby ranging error is minimized and accuracy of the measured distance between terminals is maximized even where the multi-carrier transmission system is in use. Because the transmitting terminal acquires the first and the second impulse responses in unified fashion, the processes associated with ranging are consolidated. It is also possible to make the internal structure of the receiving terminal appreciably simpler than that of the transmitting terminal.

In one preferred structure of the above-outlined embodiment of the present invention, data from the first packet received by the receiving terminal may be subjected to fast discrete Fourier transform for conversion into second frequency domain data, and the internal processing delay time may be a delay time involved in an internal process performed by the receiving terminal.

In another preferred structure of the above embodiment, the first impulse response may be time information indicating a highly accurate time at which the first packet was received, and the second impulse response may be time information indicating a highly accurate time at which the second packet was received.

A further preferred structure of the above embodiment may further include: an interpolating device interpolating carrier holes in the frequency domain data; and a frequency averaging device frequency-averaging the interpolated frequency domain data; wherein the predetermined process may include the interpolation performed by the interpolating device and the frequency-averaging carried out by the frequency averaging device.

In an even further preferred structure of the above embodiment, the interpolating device may interpolate the data corresponding to the carrier holes using data from an adjacent carrier.

According to the present invention, as outlined above, the accuracy of the measured distance between terminals under the multi-carrier transmission system is significantly boosted. That is, the ranging error in measuring distances between terminals is reduced appreciably.

BRIEF DESCRIPTION OF THE DRAWINGS

Further objects and advantages of the present invention will become apparent upon a reading of the following description and appended drawings in which:

FIG. 10 is a tabular view listing typical degrees of precision in effect when distances are measured by the ranging system;

FIG. 12 is a block diagram showing a typical structure of a receiving terminal practiced as part of the second embodiment, the terminal being the target of the ranging process.

DETAILED DESCRIPTION

Figure 1:
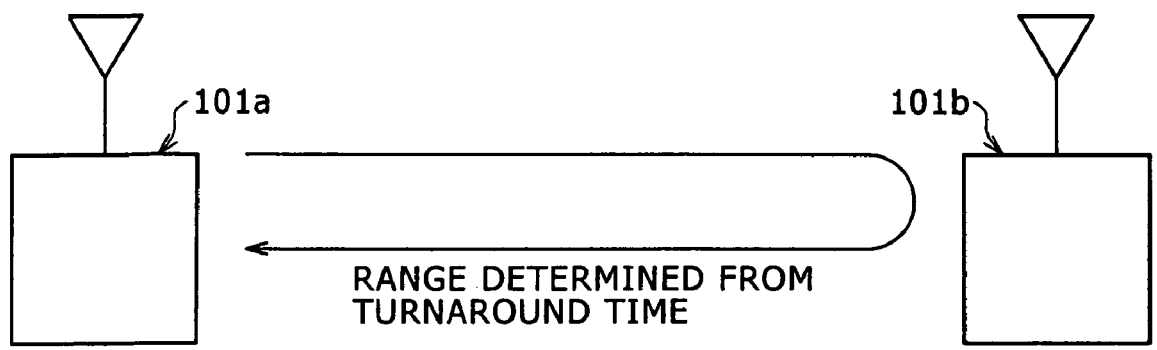
FIG. 1 is an explanatory view outlining a typical configuration of a ranging system practiced as a first embodiment of the present invention.

Preferred embodiments of the present invention will now be described in detail with reference to the accompanying drawings. Throughout the drawings and the descriptions that follow, like or corresponding parts in terms of function and structure will be designated by like reference numerals, and their explanations will be omitted where redundant.

First Embodiment

A ranging system 100 practiced as the first embodiment of the present invention is described below with reference to FIG. 1. FIG. 1 is an explanatory view outlining a typical configuration of the ranging system 100 practiced as the first embodiment.

As shown in FIG. 1, the ranging system 100 includes at least a transmitting terminal 101a (referred to as the terminal A where appropriate) for initiating a ranging process, and a receiving terminal 101b (referred to as the terminal B where appropriate) being the target of the ranging process. Alternatively, the two terminals may switch their roles. As another alternative, the ranging system may include three or more terminals 101.

The terminals 101 of the first embodiment may illustratively be a personal computer (PC) each. Alternatively, any equipment capable of sending and receiving data over a wireless LAN may act as a terminal of the ranging system 100.

The ranging process of the ranging system 100 in FIG. 1 involves measuring the distance from the terminal A to the terminal B. With the system in operation, the time it takes a packet sent by the terminal A to reach the terminal B and return from there is first measured as a turnaround time (packet turnaround time). A delay time specific to the terminals 101 is then subtracted from the measured turnaround time. This provides a radio wave delay time applicable to a given space. The distance between the terminals is then obtained by taking the delay time and radio wave velocity into consideration.

Figure 2:
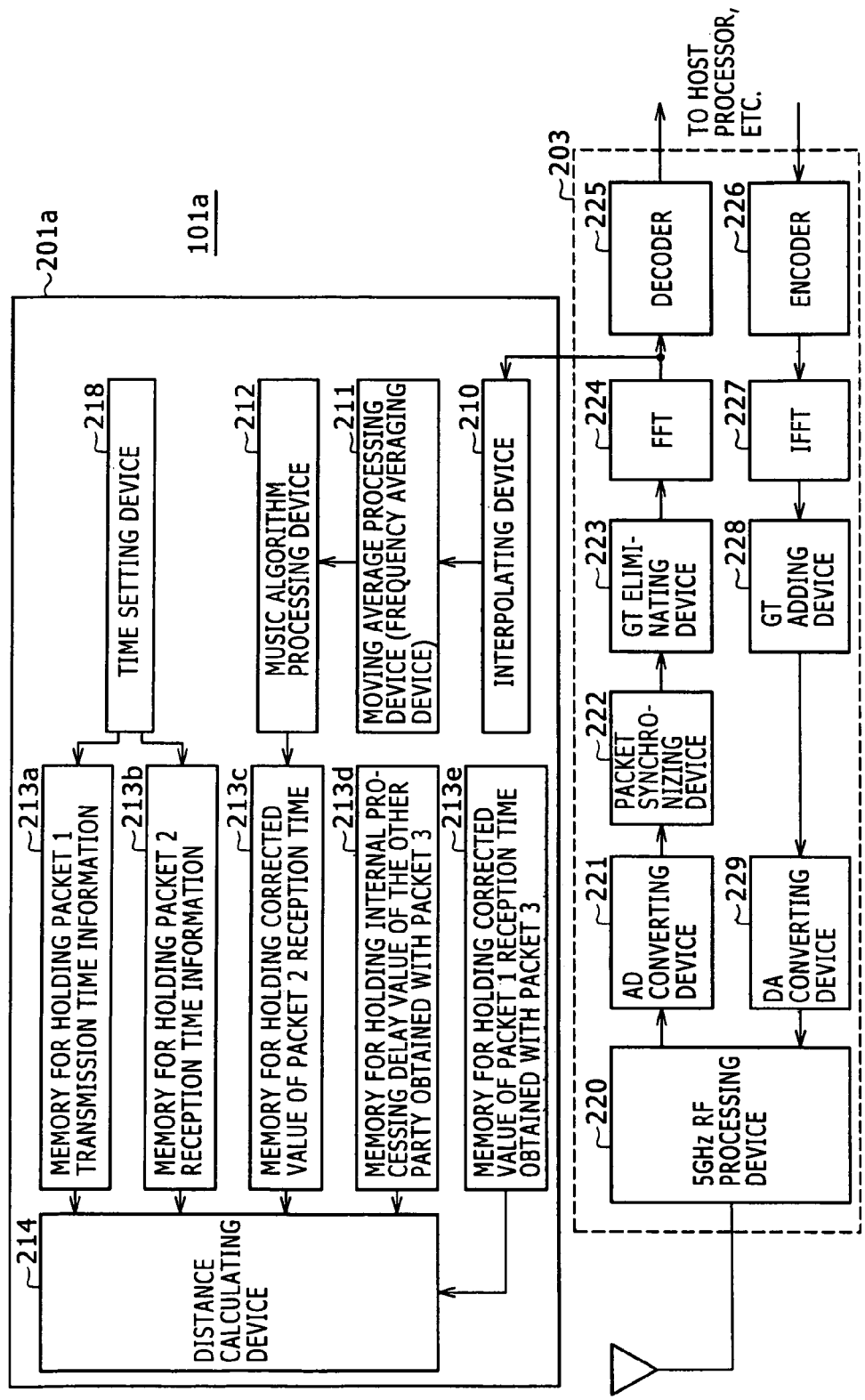
FIG. 2 is a block diagram showing a typical structure of a transmitting terminal of the first embodiment, the terminal initiating a ranging process.

Described below with reference to FIG. 2 is the terminal 101a constituting part of the first embodiment. FIG. 2 is a block diagram showing a typical structure of a transmitting terminal of the first embodiment, the terminal initiating a ranging process.

As shown in FIG. 2, the terminal 101a of the first embodiment includes a distance measurement block 201a providing the function of measuring distances, and a wireless communication block 203 having the function of transmitting and receiving data over a wireless LAN.

The distance measurement block 201a includes: an interpolating device 210 for interpolating carrier holes; a moving average processing device (frequency averaging device) 211 for processing moving averages (frequency-averaging); a MUSIC algorithm processing device (frequency domain data processing device) 212 for determining packet transmitting/receiving positions with precision through the application of the MUSIC algorithm; memories 213 (213a, 213b, ..., 213e) capable of accommodating data illustratively from packets 1 through 3; a distance calculating device (including a turnaround time estimating device, a propagation time correcting device, and a distance computing device) 214 for calculating distances between terminals 100; and a time setting device (time information generating device) 218.

The interpolating device 210 interpolates carrier holes that exist in the frequency domain data from FFT processing performed by an FFT (fast Fourier transform) device 224. The interpolation is carried out illustratively through the use of data from an adjacent carrier.

The MUSIC algorithm processing device 212 determines accurately the position where packets are transmitted and/or received by obtaining impulse responses through the application of the MUSIC algorithm. The MUSIC algorithm for use with this embodiment of the invention is substantially the same as the commonly utilized MUSIC algorithm. Details of this algorithm are discussed illustratively in "Adaptive Signal Processing by Use of Array Antennas" by Nobuyoshi Kikuma, published in Japanese from Science Press, Inc. on Sep. 20, 1998, pp. 191-203.

The above memories 213 of the first embodiment are not limited to such storing elements as RAMs. The memories may be implemented illustratively in the form of flash memories, a hard disk drive (HDD) or other suitable storing elements.

The wireless communication block 203 includes: an RF processing device 220; an AD converting device 221 for converting signals from analog to digital format; a packet synchronizing device 222; a GT eliminating device 223; an FFT device (fast discrete Fourier transform processing device) 224 for carrying out fast Fourier transforms; a decoder 225; an encoder 226; an IFFT (inverse fast Fourier transform) device 227 for carrying out inverse fast Fourier transforms; a GT adding device 228; and a DA converting device 229.

The RF processing device 220 in operation transmits and receives at least a 5-GHz RF (radio frequency) signal via an antenna.

The packet synchronizing device 222 searches for a peak of correlated values using a known signal that illustratively heads a packet in order to detect a synchronizing position by which to determine a packet-receiving position. The time setting device 218 acquires times at which packets were transmitted and received based on the detected synchronizing position.

The memory 213a holds transmission time information indicating the time at which a packet 1 (first packet) for distance measurement was transmitted (i.e., first packet transmission time information). The memory 213b holds reception time information indicating the time at which a packet 2 for distance measurement was received (i.e., packet 2 reception time information). The memory 213c holds a corrected value representing a corrected, more accurate time at which the packet 2 (second packet) for distance measurement was received (i.e., corrected packet 2 reception time (second impulse response)). The memory 213d holds an internal processing delay time (i.e., delay time occurring during an internal process) of the terminal 101b placed in a packet 3 received from the opposite terminal 101b. The memory 213e holds a corrected value representing a corrected, more accurate time at which the packet 3 (third packet) was received from the opposite terminal 101b (i.e., corrected packet 3 reception time (third impulse response)), as well as a corrected value representing a corrected, more accurate time at which the packet 1 was received by the opposite terminal 101b (i.e., corrected packet 1 reception time (first impulse response)). The packets 1 through 3 will be discussed later in more detail.

The times at which the packets 1, 2 and 3 for distance measurement were received are determined with respect to the positions where signals of the block prefixed to known packets are in synchronism with a system clock signal. That means the reception times are approximate. For more precision, the terminal 101 may illustratively use the MUSIC algorithm to obtain time information indicating a more accurate time at which the packet 1 or 2 was received (i.e., corrected packet 1 or packet 2 reception time).

The time setting device 218 has a timer function that generates time information indicative of the current time of day. In addition, the time setting device 218 places into the memory 213 (213a, 21b) the packet reception or transmission time information indicating the time at which either of the packets 1 through 3 was transmitted or received.

Figure 3:
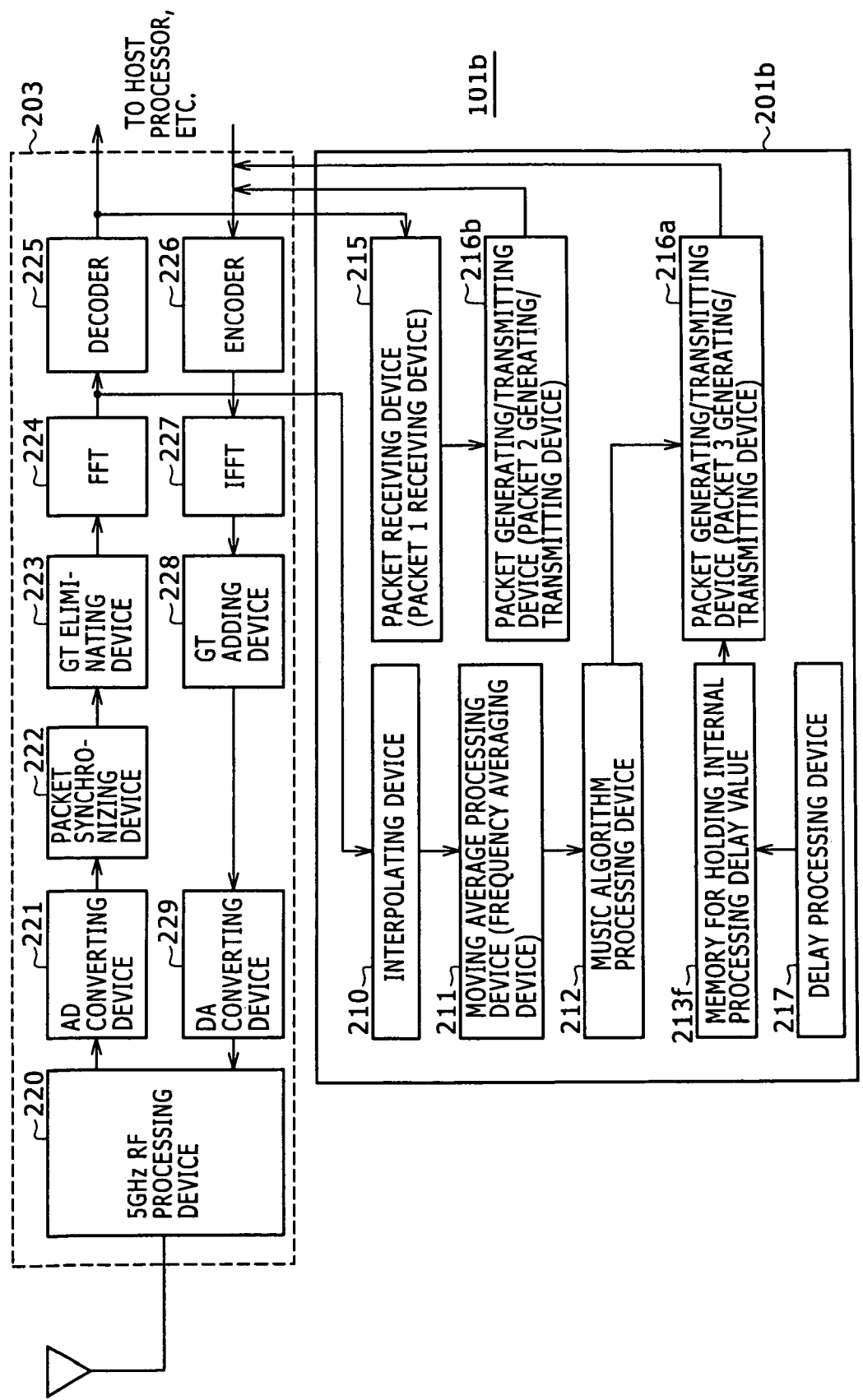
FIG. 3 is a block diagram showing a typical structure of a receiving terminal of the first embodiment, the terminal being the target of the ranging process.

Described below with reference to FIG. 3 is the terminal 101b constituting another part of the first embodiment of the invention. FIG. 3 is a block diagram showing a typical structure of a receiving terminal of the first embodiment, the terminal being the target of the ranging process.

As shown in FIG. 3, the terminal 101b of the first embodiment has a distance measurement block 201b providing the function of performing predetermined processes for measuring distances, and a wireless communication block 203 having the function of transmitting and receiving data over a wireless LAN.

The distance measurement block 201b includes an interpolating device 210, a moving average processing device 211, a MUSIC algorithm processing device 212, a memory 213 (213f), a packet receiving device 215 for receiving packets, packet generating/transmitting devices 216 (216a, 216b) for generating or transmitting packets, and a delay processing device 217.

The memory 213f holds an internal delay value occurring inside the terminal 101b (i.e., internal processing delay value). The delay value is illustratively the sum of a series of delay times occurring in the terminal 101b as it receives a packet, generates a new packet in response, and transmits the generated packet.

The delay processing device 217 acquires the internal processing delay time by adding up the delay times occurring during the processes performed by analog and digital circuits within the terminal 101b. The internal processing delay time thus obtained is placed into the memory 213f by the display processing device 217.

The packet receiving device 215 detects the packet 1 for distance measurement from among the received packets. The packet 1 will be discussed later in more detail.

The packet generating/transmitting device 216a acquires a corrected value of the time at which the packet 1 for distance measurement was received (i.e., corrected packet 1 reception time) on the basis of high-resolution impulse responses obtained by the MUSIC algorithm processing device 212. That is, the corrected packet 1 reception time is a more accurate time at which the packet 1 was received by the terminal 101b.

Furthermore, the packet generating/transmitting device 216a generates a packet 3 containing the internal processing delay value placed in the memory 213f. The packet 3 thus generated is sent to the wireless communication block 203.

The packet generating/transmitting device 216b generates the packet 2 immediately after receipt of the packet 1 by the packet receiving device 215, and sends the generated packet 2 to the wireless communication block 203. The packet 2 reaching the terminal 101a allows an approximate turnaround time to be obtained, which in turn provides an approximate distance between the terminals 101.

The above memory 213 of the first embodiment is not limited to such storing elements as a RAM. The memory may be implemented illustratively in the form of a flash memory, a hard disk drive (HDD), or other suitable storing elements.

Although the terminal 101a of the first embodiment was shown having a plurality of memories 213 (213a through 213e), this is not limitative of the invention. Alternatively, the terminal 101a may incorporate a single memory 213.

The wireless communication block 203 located in the terminal 101b of the first embodiment is substantially the same as the wireless communication block 203 in the above-described terminal 101a and thus will not be described further in detail.

Although the terminal 101a of the first embodiment was shown lacking the distance measurement block 201b, this is not limitative of the invention. Alternatively, the terminal 101a may be equipped with the distance measurement block 201b.

The terminal 101b of the first embodiment was shown lacking the distance measurement block 201a. However, this is not limitative of the invention. The terminal 101b may alternatively be equipped with the distance measurement block 201a.

The terminal 101b of the first embodiment was shown incorporating the packet generating/transmitting device 216a and packet generating/transmitting device 216b as separate entities. However, this is not limitative of the invention. Alternatively, the terminal 101b may be equipped with a single packet generating/transmitting device 216.

As described above, the structures of the terminals 101 in FIGS. 2 and 3 involve having the MUSIC algorithm processing device 212 placed in both the measuring side (terminal 101a) and the measured side (terminal 101b). The terminal structures permit determination of a highly accurate packet position.

The accurate packet position is determined by applying the MUSIC algorithm, one of high-resolution spectrum estimation algorithms, to the frequency domain data having undergone fast Fourier transform (FFT) by the FFT device 224 in the terminal 101b. The algorithm triggers generation of high-resolution impulse responses for position determination.

In general, the items of frequency domain data are closely correlated to one another. For that reason, the application of the MUSIC algorithm to frequency domain data requires carrying out preprocessing called frequency averaging. This advance process, performed by the moving average processing device 211, is common to applications where the MUSIC algorithm is in use.

On the wireless LAN, there usually exist carrier holes in frequency domain data because the DC component is not used. The carrier with these carrier holes has zero energy. That is, in order to perform frequency averaging (moving average) prior to the processing by the MUSIC algorithm processing device 212, it is required to interpolate in advance the frequency data in the positions of the carrier holes using adjacent carrier data.

That requirement is met, as shown in FIGS. 2 and 3, by the interpolating device 210 and moving average processing device 211 in the terminal 101. Before the processing by the MUSIC algorithm processing device 212, the interpolating device 210 and moving average processing device 211 carry out their processes.

Traditionally, MUSIC algorithms have been applied primarily to the analysis of adaptive array propagations. Simply applying the MUSIC algorithm to a wireless LAN ranging system has not necessarily resulted in measuring distances with high precision.

Figure 4:
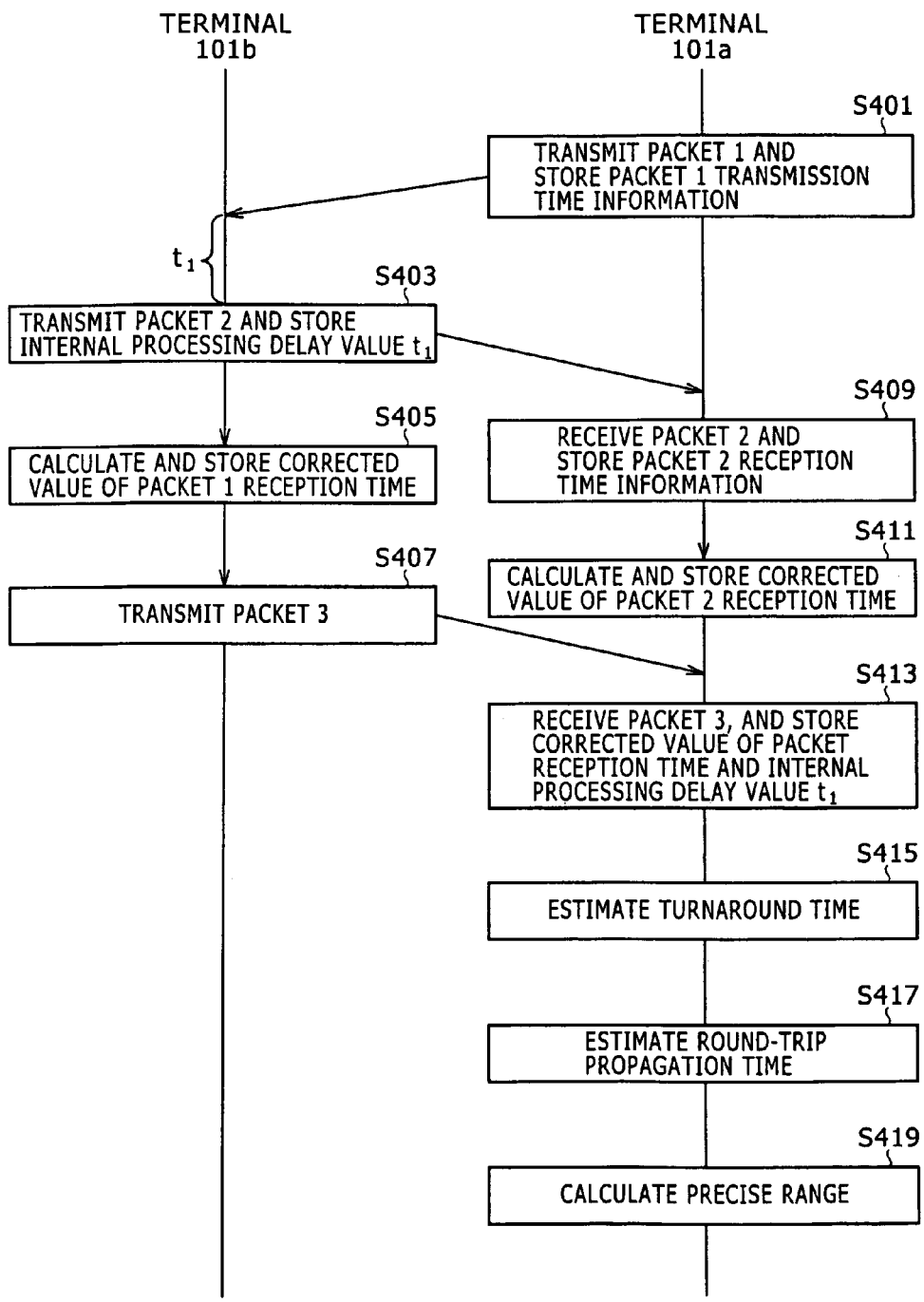
FIG. 4 is a sequence diagram outlining a series of steps performed by the ranging system as the first embodiment.

Described below with reference to FIG. 4 is a series of steps carried out by the ranging system 100 practiced as the first embodiment of the present invention. FIG. 4 is a sequence diagram outlining the steps performed by the ranging system 100. In this case, the terminal 101a (transmitting terminal) initiates a ranging process, and the terminal 101b (receiving terminal) is the target of the ranging process. The roles of the terminals may alternatively be switched.

As shown in FIG. 4, the terminal 101a first transmits a packet 1 for measuring the distance up to the terminal 101b. At the same time, the terminal 101a stores into the memory 213a packet 1 transmission time information indicating the time at which the packet 1 was transmitted to its destination (step S401).

The terminal 101b starts receiving packets. On recognizing the packet 1 for distance measurement, the terminal 101b immediately starts generating a packet 2 and returns the generated packet 2 for distance measurement as soon as possible (step S403). When transmitting the packet 2, the terminal 101b places into the memory 213f a delay time value (internal processing delay value $t_1$) that sums up delays in digital processes before a DA conversion and analog processes thereafter (step S403).

The terminal 101b receives the packet 1 from the terminal 101a. The received packet is subjected to fast Fourier transform by the FFT device 224 in the wireless communication block 203. The carrier holes in the frequency data following the FFT process are interpolated. The interpolated data is arranged to undergo a frequency averaging process before the application of the MUSIC algorithm to obtain a high-resolution impulse response. Based on that impulse response, a corrected packet 1 reception time is acquired (step S405). The corrected packet 1 reception time is placed into the memory 213. The corrected packet 1 reception time may alternatively be stored into the memory 213f or into some other storing section (not shown) that may be located in the terminal 101b.

The packet generating/transmitting device 216a in the terminal 101b generates a packet 3 that includes the above-mentioned internal processing delay value and corrected packet 1 reception time. The generated packet 3 is sent to the wireless communication block 203 (step S407). From the RF processing device 220 in the wireless communication block 203, the packet is transmitted wirelessly to the terminal 101a.

Upon receipt of the packet 2 by the terminal 101a, packet 2 reception time information indicating the time at which the packet 2 was received is placed into the memory 213b (step S409).

The terminal 101a receives the packet 2 that is subjected to fast Fourier transform by the FFT device 224. After the FFT process, the carrier holes in the frequency data are interpolated and subjected to frequency averaging. The MUSIC algorithm is applied to the resulting data, which provides a high-resolution impulse response. Based on that impulse response, a corrected packet 2 reception time is obtained and placed into the memory 213c (step S411).

The terminal 101a then receives the packet 3 from the terminal 101b. From the packet 3, the terminal 101a acquires the corrected packet 1 reception time and the internal processing delay time $t_1$ which were obtained by the terminal 101b. The corrected packet 1 reception time and internal processing delay value $t_1$ are stored into the memories 213e and 213d, respectively (step S413).

The distance calculating device (turnaround time estimating device) 214 in the terminal 101a acquires the packet 1 transmission time information from the memory 213a and the packet 2 reception time information from the memory 213b. From these two items of information, the distance calculating device 214 estimates a turnaround time (step S415).

With the first embodiment of the invention, the turnaround time is estimated by subtracting the packet 1 transmission time from the packet 2 reception time (i.e., packet 2 reception time information−packet transmission time information=estimated turnaround time (packet turnaround time)).

The distance calculating device 214 in the terminal 101a acquires an estimated turnaround radio wave propagation time (propagation turnaround time) by subtracting the internal processing delay value $t_1$ of the terminal 101b (i.e., opposite party) from the estimated turnaround time (step S417). The estimated propagation turnaround time is obtained from the formula of "propagation turnaround time=estimated turnaround time−internal processing delay time of the opposite party."

The distance calculating device (propagation time correcting device) 214 in the terminal 101a acquires the corrected packet 2 reception time from the memory 213c and the corrected packet 1 reception time from the memory 213e. The distance calculating device 214 acquires a highly accurate propagation turnaround time (corrected propagation turnaround time) by correcting the estimated propagation turnaround time obtained in step S417 on the basis of the two corrected values above. From the highly accurate propagation turnaround time and the radio wave velocity ($3.0 \times 10^8$ m/s), the distance calculating device (distance computing device) 214 calculates the distance between the terminals 101 (step S419). This is how the ranging system 100 practiced as the first embodiment of this invention carries out its steps in series.

Described below are other aspects of the ranging system 100 practiced as the first embodiment of the invention. In the ensuing description, the embodiment will be shown operating in an OFDM modulation system setup using a 40-MHz bandwidth under the 5-GHz OFDM (orthogonal frequency division multiplex) modulation system. However, this is not limitative of the invention. Any suitable multi-carrier transmission setup may alternatively be adopted for the inventive ranging system 100.

The ranging system 100 as the first embodiment is assumed to use a 128-point FFT device 224 and 114 subcarriers. It is also assumed that three carrier holes exist near the DC component. It is under these assumptions that the ranging system 100 is described below.

The three carrier holes that exist near the DC component are interpolated using adjacent or nearby carrier values. In this case, the MUSIC algorithm is applied to the frequency data of the 117 subcarriers in total. Before the MUSIC algorithm is applied, the 117-subcarrier frequency data is to be averaged as mentioned above.

Figure 5:
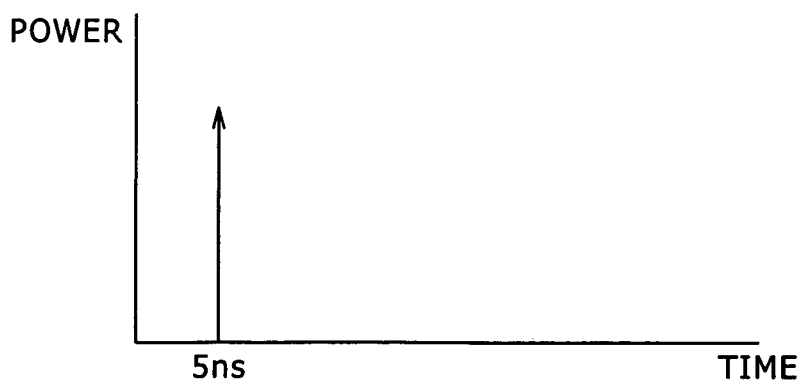
FIG. 5 is an explanatory view showing a typical impulse response in which a direct wave generated by the first embodiment spikes upon elapse of 5 nanoseconds.

The impulse response acquired by application of the MUSIC algorithm is assumed to be such that a direct wave spikes upon elapse of 5 ns, as shown in FIG. 5. FIG. 5 is an explanatory view showing a typical impulse response in which the direct wave generated by the first embodiment peaks approximately upon elapse of 5 ns.

Figure 6:
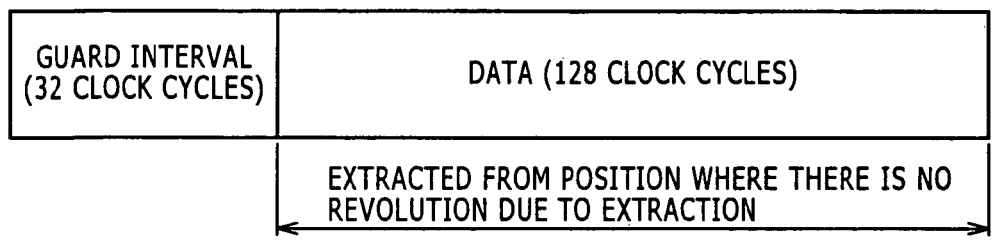
FIG. 6 is an explanatory view outlining the position from which data is extracted.
Figure 7:
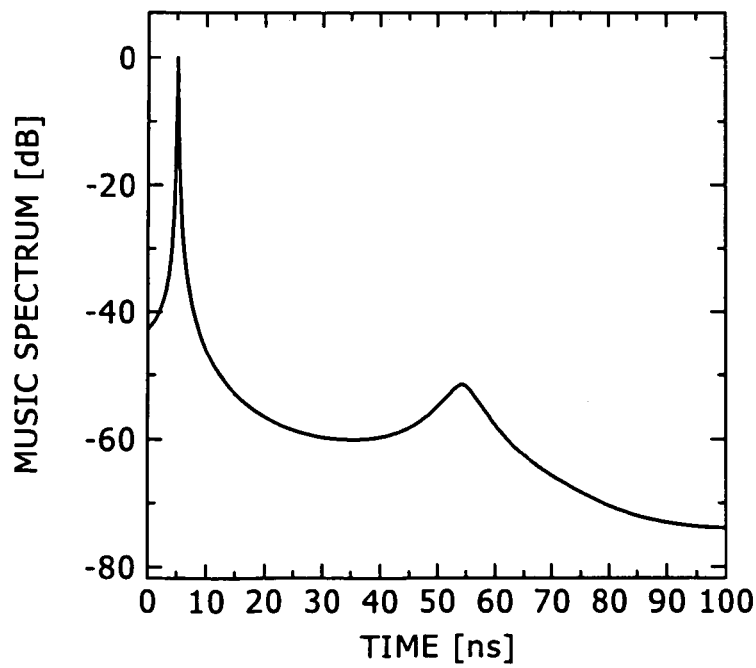
FIG. 7 is a graphic representation showing how a MUSIC spectrum is structured.

Suppose that, as shown in FIG. 6, the packet synchronizing position determined by the packet synchronizing device in the terminal 101 is used as the basis for extracting data following the FFT process. In that case, with the MUSIC algorithm applied, a MUSIC spectrum appears as illustrated in FIG. 7. FIG. 6 is an explanatory view outlining the position from which data is extracted, and FIG. 7 is a graphic representation showing how the MUSIC spectrum is typically structured.

A guard interval, provided as indicated in FIG. 6, can suppress adverse effects (e.g., multipath interference) of temporally staggered signals (i.e., ghosts) that typically occur in the receiving position due to irregular reflection.

It can be seen from FIG. 7 that the MUSIC spectrum spikes approximately upon elapse of 5 ns. In the data extracting position indicated in FIG. 6, the MUSIC spectrum peaks at 5 ns. However, it is not necessarily easy to extract data from that position; the extracting position often varies.

Figure 8:
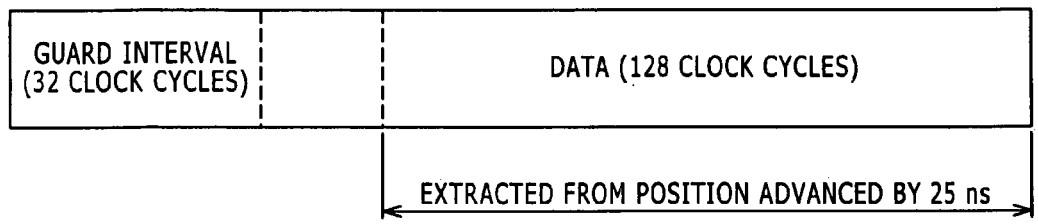
FIG. 8 is an explanatory view outlining the position from which data shifted forward by 25 ns is extracted.

In order to give some margin of error to the extraction of data, the data extracting position subsequent to the FFT process may be shifted forward illustratively by one sample (25 ns). This gives the data extracting position shown in FIG. 8. FIG. 8 is an explanatory view outlining the position from which data shifted forward by 25 ns is extracted.

Figure 9:
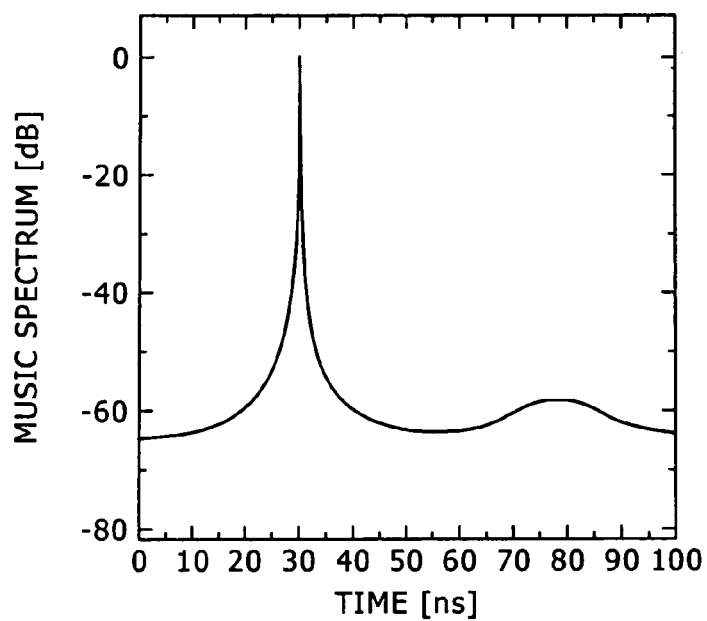
FIG. 9 is a graphic representation showing how the MUSIC spectrum is otherwise structured.

If data is extracted from the data extracting position indicated in FIG. 8 followed by the application of the MUSIC algorithm, then the MUSIC spectrum appears as shown in FIG. 9. FIG. 9 is a graphic representation showing how the MUSIC spectrum is structured in an alternative way.

As shown in FIG. 9, the MUSIC spectrum peaks approximately upon elapse of 30 ns. This is the value obtained by supplementing the spiked position (5 ns) of the MUSIC spectrum in FIG. 7 with the forward-shifted data extracting position (25 ns) of FIG. 8. That is, the peak of the MUSIC spectrum is shifted by about the same amount as the shift in the data extracting position. If the shift in the extracting position is known in advance, then the MUSIC spectrum may be corrected in such a manner as to spike at 5 ns for high-precision distance measurement. As described, when the MUSIC algorithm is applied to the data derived from fast Fourier transform under the OFDM modulation system, the position in which to transmit or receive packets can be determined at degrees of resolution finer than the width of the system clock signal. That means the distance between the terminals 101 can be measured more accurately than ever before.

Meanwhile, under a UWB (ultra wideband communication) wireless system, packets can be synchronized illustratively at 2 GHz because high-speed pulses are used. Since the width of the 2-GHz clock is defined as ½ GHz=0.5 ns, it is possible to measure distances with precision to $3.0 \times 10^8$ m/s × 0.5 ns=0.15 m. Although this embodiment relies on a clock not as fast as that of the UWB, the inventive system nevertheless permits distance measurement with high precision.

Lastly, FIG. 10 shows typical degrees of precision observed in a ranging process where distances were measured by the ranging system 100 on the assumption that SN=20 dB. From FIG. 10, it can be seen that "range errors" in measurements fall within a range of 0.09 cm to 0.27 cm (0.144 cm on average) in all tries made. The range error can thus be minimized, with the distances measured on the order of not meters but centimeters. The set time is a value (5 ns) that is the target of expected impulse responses.

MUSIC algorithms have already been applied to the analysis of adaptive array propagations. However, few, if ever, of those skilled in the art have thought of combining the use of the MUSIC algorithm with the ranging system such as the first embodiment operating on the wireless LAN. That is because simply applying the data derived from FFT to the MUSIC algorithm does not bring about high-precision ranging unless interpolation is carried out illustratively by the above-described interpolating device 210. Thus the application of the MUSIC algorithm to the ranging system 100 based on the wireless LAN has occurred to few of those skilled in the art.

Second Embodiment

Figure 11:
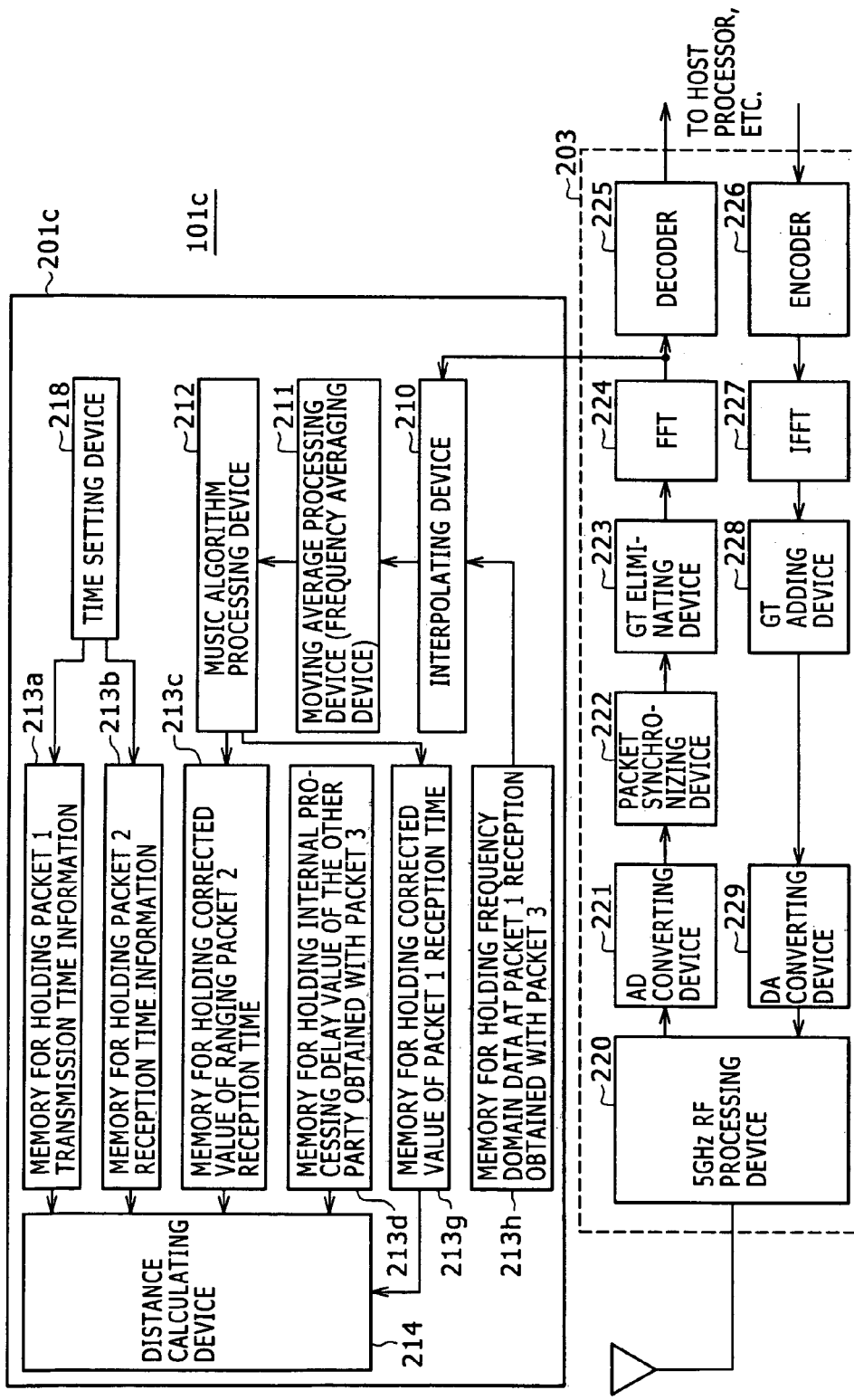
FIG. 11 is a block diagram showing a typical structure of a transmitting terminal practiced as part of a second embodiment of the present invention, the terminal initiating a ranging process.

The terminal 101 practiced as the second embodiment of the present invention will now be described with reference to FIGS. 11 and 12. FIG. 11 is a block diagram showing a typical structure of the transmitting terminal (101c) practiced as part of the second embodiment of the invention, the terminal initiating a ranging process, and FIG. 12 is a block diagram showing a typical structure of the receiving terminal (101d) practiced as another part of the second embodiment, the terminal being the target of the ranging process.

The ranging system of the second embodiment is configured in substantially the same way as the ranging system 100 of the first embodiment explained above with reference to FIG. 1 and thus will not be discussed further in detail. The terminals 101 of the second embodiment will be discussed in detail where they differ from their counterparts of the first embodiment. The resembling aspects of the terminals will not be described further in detail to avoid unnecessary repetition.

In the ranging system of the second embodiment, only the transmitting terminal (101c) initiating the ranging process applies the MUSIC algorithm to the measurement of a terminal-to-terminal distance. In the ranging system of the first embodiment, by contrast, both the transmitting and the receiving terminals apply the MUSIC algorithm in measuring the distance therebetween.

Comparing the transmitting terminal 101c of the second embodiment with the transmitting terminal 101a of the first embodiment in FIG. 1 reveals the following difference: the packet 3 received from the receiving terminal 101d does not include the corrected packet 1 reception time. The frequency domain data in effect upon receipt of the packet 1 by the terminal 101d is received therefrom by the transmitting terminal 101c, so that the latter terminal acquires the corrected packet 1 reception time.

More specifically, as shown in FIG. 11, the terminal 101c of the second embodiment differs from the terminal 101a of the first embodiment in that the terminal 101c is furnished with memories 213g and 213h. The memory 213g holds the corrected packet 1 reception time obtained by the terminal 101c, and the memory 213h accommodates the frequency domain data in effect upon receipt of the packet 1 by the terminal 101d, the memory 213h replacing the memory 213e of the terminal 101a of the first embodiment.

Although the memories 213g and/or 213h in the terminal 101c of the second embodiment were shown distinct from the other memories 213 (213a, 213b, 213c, 213d) in the foregoing description, this is not limitative of the invention. Alternatively, the memories 213g and/or 213h may be integrated into at least one of the other memories (213a, 213b, 213c, 213d).

The receiving terminal 101d of the second embodiment differs primarily from the receiving terminal 101b of the first embodiment in the following aspect: the terminal 101d lacks the MUSIC algorithm processing device 212, moving average processing device 211 and interpolating device 210, and is furnished with a packet generating/transmitting device 216c replacing the packet generating/transmitting device 216a of the first embodiment.

The packet generating/transmitting device 216c generates the packet 3 including at least the frequency domain data in effect upon receipt of the packet 1 by the terminal 101d and the internal processing delay value of the terminal 101d, and sends the generated packet 3 to the wireless communication block 203. The remaining aspects of the terminal 101c are substantially the same as those of the terminal 101b of the first embodiment.

That is, the terminal 101d of the second embodiment in FIG. 12 does not transmit the corrected packet 1 reception time in the packet 3 to the terminal 101c. Instead, the terminal 101d transmits the original frequency domain data in effect upon receipt of the packet 1 to the terminal 101c using the packet 3.

On receiving the packet 3 from the terminal 101d, the terminal 101c of the second embodiment in FIG. 11 acquires from the packet 3 the frequency domain data in effect upon receipt of the packet 1 and the internal processing delay value. A corrected packet 1 reception time is then obtained by executing the MUSIC algorithm using the frequency domain data.

Whereas the terminal 101b of the first embodiment was shown acquiring the corrected packet 1 reception time by executing the MUSIC algorithm, the terminal 101d of the second embodiment need only transmit the original frequency data in effect upon receipt of the packet 1; there is no need to obtain the corrected packet 1 reception time. This alleviates the processing burdens on the terminal 101d and helps simplify the circuitry in that terminal.

The steps performed in series by the ranging system of the second embodiment are basically the same as those carried out by the ranging system of the first embodiment. The notable difference is that the transmitting terminal 101c initiating the ranging process is to obtain both the corrected packet 1 reception time and the corrected packet 2 reception time. The similar or identical steps will not be discussed further. The foregoing has been the explanation of the ranging system practiced as the second embodiment of the present invention.

The series of steps performed by the ranging system of the above-described first or second embodiment may be executed either by dedicated hardware or by suitable software. For software-based processing to take place, the program or programs making up the necessary software are installed beforehand into storing elements such as the memories 213 in the terminal 101 constituted by a general-purpose computer, a microcomputer or like equipment.

The program or programs for causing the terminal 101 to act as part of the ranging system may be recorded beforehand on a hard disk drive (HDD) or in a ROM, a RAM or other suitable recording elements incorporated in the computer.

The programs may be held temporarily or permanently not only on the HDD but also in removable storage media such as flexible disks, CD-ROMs (Compact Disc read-only memory), MO (magneto-optical) disks, DVDs (digital versatile disc), magnetic disks, or semiconductor memories. Such removable recording media may be offered illustratively in the form of so-called package software.

The programs may be installed into the computer from the above-mentioned removable storage media, or may be transferred to the terminal 101 from websites wirelessly over digital satellite broadcast links or in wired fashion over networks such as a LAN (local area network) the Internet. The transferred programs are received by the terminal 101 and installed onto a HDD or into some other suitable storage device inside.

In this specification, the steps that describe the program or programs for causing the terminal 101 to perform diverse operations represent not only the processes that are to be carried out in the depicted sequence in FIG. 4 (i.e., on a time series basis) but also processes that may be carried out parallelly or individually and not chronologically.

As mentioned above in connection with the first embodiment, MUSIC algorithms have already been applied to the analysis of adaptive array propagations. Few of those skilled in the art, however, have thought of combining the use of the MUSIC algorithm with the ranging system such as the second embodiment operating on the wireless LAN. That is because simply applying the data derived from FFT to the MUSIC algorithm does not bring about high-precision ranging unless interpolation is carried out illustratively by the above-described interpolating device 210. Thus the application of the MUSIC algorithm to the ranging system 100 based on the wireless LAN has occurred to few of those skilled in the art.

It is to be understood that while the invention has been described in conjunction with specific embodiments with reference to the accompanying drawings, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

For example, although the inventive ranging system 100 was shown measuring the distance between terminals using the MUSIC algorithm, this is not limitative of the invention.

Other suitable algorithms may be used in conjunction with the present invention provided they are spectrum estimation algorithms.

In the foregoing description, the memory was shown made up of a plurality of storing elements. Alternatively, the storing elements may be implemented in the form of a single memory or a hard disk drive.

The terminal 101*b* was shown furnished with the packet generating/transmitting devices 216*a* and 216*b* as separate entities. Alternatively, the two devices may be integrated into a single packet generating/transmitting device 216 located in the terminal 101*b*.

Furthermore, although the devices of the terminal 101 were shown constituted by hardware, this is not limitative of the invention. Alternatively, the devices of the terminal may be provided in the form of a program or programs constituted by one or a plurality of software modules or components.

As described, the present invention may be applied advantageously to a ranging system, a transmitting terminal, a receiving terminal, a ranging method, and a computer program for use with a multi-carrier transmission system.

The invention claimed is:

1. A transmitting terminal constituting part of a ranging system for measuring a distance between terminals operating on a multi-carrier transmission system, said transmitting terminal comprising:
   a packet transmitting device transmitting a first packet to a receiving terminal communicating with said transmitting terminal;
   a time information generating device generating at least first packet transmission time information indicating the time at which said first packet was transmitted;
   a turnaround time estimating device estimating a packet turnaround time between said receiving and said transmitting terminals based on said first packet transmission time information and on second packet reception time information indicating the time at which a second packet was transmitted to said transmitting terminal by said receiving terminal upon receipt of said first packet;
   a fast discrete Fourier transform processing device subjecting data from said second packet received from said receiving terminal to fast discrete Fourier transform for conversion into first frequency domain data;
   a frequency domain data processing device acquiring a first impulse response by subjecting said first frequency domain data to a predetermined process and by applying a spectrum estimation algorithm to the processed first frequency domain data;
   a propagation time correcting device which, upon receipt of a third packet from said receiving terminal in a suitably timed manner, estimates a radio wave turnaround propagation time by subtracting an internal processing delay time placed in said third packet from said packet turnaround time in order to correct, based on said first impulse response and on a second impulse response placed in said third packet, said radio wave turnaround propagation time into a corrected propagation turnaround time; and
   a distance calculating device acquiring the distance between said transmitting and said receiving terminals in accordance with said corrected propagation turnaround time and with radio wave velocity.

2. The transmitting terminal according to claim 1, wherein said second impulse response is acquired by subjecting data from said first packet received by said receiving terminal to fast discrete Fourier transform for conversion into second frequency domain data subject to a predetermined process and by applying said spectrum estimation algorithm to the processed second frequency domain data, and wherein said internal processing delay time is a delay time involved in an internal process performed by said receiving terminal.

3. The transmitting terminal according to claim 1, wherein said first impulse response is time information indicating a highly accurate time at which said second packet was received, and wherein said second impulse response is time information indicating a highly accurate time at which said first packet was received.

4. The transmitting terminal according to claim 1, further comprising:
   an interpolating device interpolating carrier holes in said frequency domain data; and
   a frequency averaging device frequency-averaging the interpolated frequency domain data;
   wherein said predetermined process includes the interpolation performed by said interpolating device and the frequency-averaging carried out by said frequency averaging device.

5. The transmitting terminal according to claim 4, wherein said interpolating device interpolates the data corresponding to said carrier holes using data from an adjacent carrier.

6. A ranging method for use with a transmitting terminal constituting part of a ranging system for measuring a distance between terminals operating on a multi-carrier transmission system, said ranging method comprising the steps of:
   transmitting a first packet to a receiving terminal communicating with said transmitting terminal;
   generating at least first packet transmission time information indicating the time at which said first packet was transmitted;
   estimating a packet turnaround time between said receiving and said transmitting terminals based on said first packet transmission time information and on second packet reception time information indicating the time at which a second packet was transmitted to said transmitting terminal by said receiving terminal upon receipt of said first packet;
   subjecting data from said second packet received from said receiving terminal to fast discrete Fourier transform for conversion into first frequency domain data;
   acquiring a first impulse response by subjecting said first frequency domain data to a predetermined process and by applying a spectrum estimation algorithm to the processed first frequency domain data;
   upon receipt of a third packet from said receiving terminal in a suitably timed manner, estimating a radio wave turnaround propagation time by subtracting an internal processing delay time placed in said third packet from said packet turnaround time in order to correct, based on said first impulse response and on a second impulse response placed in said third packet, said radio wave turnaround propagation time into a corrected propagation turnaround time; and
   acquiring the distance between said transmitting and said receiving terminals in accordance with said corrected propagation turnaround time and with radio wave velocity.

7. A computer program on a computer-readable medium for causing a computer to function as a transmitting terminal constituting part of a ranging system for measuring a distance between terminals operating on a multi-carrier transmission system, said computer program comprising:
   packet transmitting section for transmitting a first packet to a receiving terminal communicating with said transmitting terminal;

time information generating section for generating at least first packet transmission time information indicating the time at which said first packet was transmitted;

turnaround time estimating section for estimating a packet turnaround time between said receiving and said transmitting terminals based on said first packet transmission time information and on second packet reception time information indicating the time at which a second packet was transmitted to said transmitting terminal by said receiving terminal upon receipt of said first packet;

fast discrete Fourier transform processing section for subjecting data from said second packet received from said receiving terminal to fast discrete Fourier transform for conversion into first frequency domain data;

frequency domain data processing section for acquiring a first impulse response by subjecting said first frequency domain data to a predetermined process and by applying a spectrum estimation algorithm to the processed first frequency domain data;

propagation time correcting section which, upon receipt of a third packet from said receiving terminal in a suitably timed manner, estimates a radio wave turnaround propagation time by subtracting an internal processing delay time placed in said third packet from said packet turnaround time in order to correct, based on said first impulse response and on a second impulse response placed in said third packet, said radio wave turnaround propagation time into a corrected propagation turnaround time; and distance calculating section for acquiring the distance between said transmitting and said receiving terminals in accordance with said corrected propagation turnaround time and with radio wave velocity.

8. A receiving terminal constituting part of a ranging system for measuring a distance between terminals operating on a multi-carrier transmission system, said receiving terminal comprising:

a first packet transmitting device which, upon receipt of a first packet from a transmitting terminal communicating with said receiving terminal, generates a second packet for transmission to said transmitting terminal;

a fast discrete Fourier transform processing device subjecting data from said first packet received from said transmitting terminal to fast discrete Fourier transform for conversion into frequency domain data;

a frequency domain data processing device acquiring an impulse response by subjecting said frequency domain data to a predetermined process and by applying a spectrum estimation algorithm to the processed frequency domain data;

a processing delay calculating device acquiring an internal processing delay time as a processing delay time involved in an internal process performed by said receiving terminal; and a second packet transmitting device generating a third packet including at least said impulse response and said internal processing delay time in order to transmit said third packet in a suitably timed manner to said transmitting terminal.

9. The receiving terminal according to claim 8, wherein said impulse response constitutes time information indicating a highly accurate time at which said first packet was received.

10. The receiving terminal according to claim 8, further comprising:

an interpolating device interpolating carrier holes in said frequency domain data; and a frequency averaging device frequency-averaging the interpolated frequency domain data;

wherein said predetermined process includes the interpolation performed by said interpolating device and the frequency-averaging carried out by said frequency averaging device.

11. The receiving terminal according to claim 10, wherein said interpolating device interpolates the data corresponding to said carrier holes using data from an adjacent carrier.

12. A transmitting terminal constituting part of a ranging system for measuring a distance between terminals operating on a multi-carrier transmission system, said transmitting terminal comprising:

a packet transmitting device transmitting a first packet to a receiving terminal communicating with said transmitting terminal;

a time information generating device generating at least first packet transmission time information indicating the time at which said first packet was transmitted;

a turnaround time estimating device estimating a packet turnaround time between said receiving and said transmitting terminals based on said first packet transmission time information and on second packet reception time information indicating the time at which a second packet was transmitted to said transmitting terminal by said receiving terminal upon receipt of said first packet;

a fast discrete Fourier transform processing device subjecting data from said second packet received from said receiving terminal to fast discrete Fourier transform for conversion into first frequency domain data;

a frequency domain data processing device which, upon receipt of a third packet from said receiving terminal in a suitably timed manner, acquires a first impulse response by subjecting second frequency domain data included in said third packet to a predetermined process and by applying a spectrum estimation algorithm to the processed second frequency domain data, said frequency domain data processing device further acquiring a second impulse response by subjecting said first frequency domain data to a predetermined process and by applying said spectrum estimation algorithm to the processed first frequency domain data;

a propagation time correcting device estimating a radio wave turnaround propagation time by subtracting an internal processing delay time placed in said third packet from said packet turnaround time in order to correct, based on said first and said second impulse responses, said radio wave turnaround propagation time into a corrected propagation turnaround time; and a distance calculating device acquiring the distance between said transmitting and said receiving terminals in accordance with said corrected propagation turnaround time and with radio wave velocity.

13. The transmitting terminal according to claim 12, wherein data from said first packet received by said receiving terminal is subjected to fast discrete Fourier transform for conversion into second frequency domain data, and wherein said internal processing delay time is a delay time involved in an internal process performed by said receiving terminal.

14. The transmitting terminal according to claim 12, wherein said first impulse response is time information indicating a highly accurate time at which said first packet was received, and wherein said second impulse response is time information indicating a highly accurate time at which said second packet was received.

15. The transmitting terminal according to claim 12, further comprising:

an interpolating device interpolating carrier holes in said frequency domain data; and a frequency averaging device frequency-averaging the interpolated frequency domain data;

herein said predetermined process includes the interpolation performed by said interpolating device and the frequency-averaging carried out by said frequency averaging device.

16. The transmitting terminal according to claim 15, wherein said interpolating device interpolates the data corresponding to said carrier holes using data from an adjacent carrier.

17. A ranging method for use with a transmitting terminal constituting part of a ranging system for measuring a distance between terminals operating on a multi-carrier transmission system, said ranging method comprising the steps of:

transmitting a first packet to a receiving terminal communicating with said transmitting terminal;

generating at least first packet transmission time information indicating the time at which said first packet was transmitted;

estimating a packet turnaround time between said receiving and said transmitting terminals based on said first packet transmission time information and on second packet reception time information indicating the time at which a second packet was transmitted to said transmitting terminal by said receiving terminal upon receipt of said first packet;

subjecting data from said second packet received from said receiving terminal to fast discrete Fourier transform for conversion into first frequency domain data;

upon receipt of a third packet from said receiving terminal in a suitably timed manner, acquiring a first impulse response by subjecting second frequency domain data included in said third packet to a predetermined process and by applying a spectrum estimation algorithm to the processed second frequency domain data, before acquiring a second impulse response by subjecting said first frequency domain data to a predetermined process and by applying said spectrum estimation algorithm to the processed first frequency domain data;

estimating a radio wave turnaround propagation time by subtracting an internal processing delay time placed in said third packet from said packet turnaround time in order to correct, based on said first and said second impulse responses, said radio wave turnaround propagation time into a corrected propagation turnaround time; and acquiring the distance between said transmitting and said receiving terminals in accordance with said corrected propagation turnaround time and with radio wave velocity.

18. A computer program on a computer-readable medium for causing a computer to function as a transmitting terminal constituting part of a ranging system for measuring a distance between terminals operating on a multi-carrier transmission system, said computer program comprising:

packet transmitting section for transmitting a first packet to a receiving terminal communicating with said transmitting terminal;

time information generating section for generating at least first packet transmission time information indicating the time at which said first packet was transmitted;

turnaround time estimating section for estimating a packet turnaround time between said receiving and said transmitting terminals based on said first packet transmission time information and on second packet reception time information indicating the time at which a second packet was transmitted to said transmitting terminal by said receiving terminal upon receipt of said first packet;

fast discrete Fourier transform processing section for subjecting data from said second packet received from said receiving terminal to fast discrete Fourier transform for conversion into first frequency domain data;

frequency domain data processing section which, upon receipt of a third packet from said receiving terminal in a suitably timed manner, acquires a first impulse response by subjecting second frequency domain data included in said third packet to a predetermined process and by applying a spectrum estimation algorithm to the processed second frequency domain data, said frequency domain data processing means further acquiring a second impulse response by subjecting said first frequency domain data to a predetermined process and by applying said spectrum estimation algorithm to the processed first frequency domain data;

propagation time correcting section for estimating a radio wave turnaround propagation time by subtracting an internal processing delay time placed in said third packet from said packet turnaround time in order to correct, based on said first and said second impulse responses, said radio wave turnaround propagation time into a corrected propagation turnaround time; and distance calculating section for acquiring the distance between said transmitting and said receiving terminals in accordance with said corrected propagation turnaround time and with radio wave velocity.

19. A receiving terminal constituting part of a ranging system for measuring a distance between terminals operating on a multi-carrier transmission system, said receiving terminal comprising:

a first packet transmitting device which, upon receipt of a first packet from a transmitting terminal communicating with said receiving terminal, generates a second packet for transmission to said transmitting terminal;

a fast discrete Fourier transform processing device subjecting data from said first packet received from said transmitting terminal to fast discrete Fourier transform for conversion into frequency domain data;

a processing delay calculating device acquiring an internal processing delay time as a processing delay time involved in an internal process performed by said receiving terminal; and a second packet transmitting device generating a third packet including at least said frequency domain data and said internal processing delay time in order to transmit said third packet in a suitably timed manner to said transmitting terminal.

\* \* \* \* \*